PHILIP MAIER.

Improvement in Cultivators.

No. 115,875.            Patented June 13, 1871.

UNITED STATES PATENT OFFICE.

PHILIP MAIER, OF MAPLETON, WISCONSIN.

IMPROVEMENT IN CULTIVATORS.

Specification forming part of Letters Patent No. 115,875, dated June 13, 1871.

*To all whom it may concern:*

Be it known that I, PHILIP MAIER, of Mapleton, in the county of Waukesha and State of Wisconsin, have invented a new and useful Improvement in Cultivators; and I do hereby declare the following to be a full, clear, and exact description thereof, which will enable those skilled in the art to make and use the same, reference being had to the accompanying drawing forming part of this specification, in which drawing—

Figure 1:
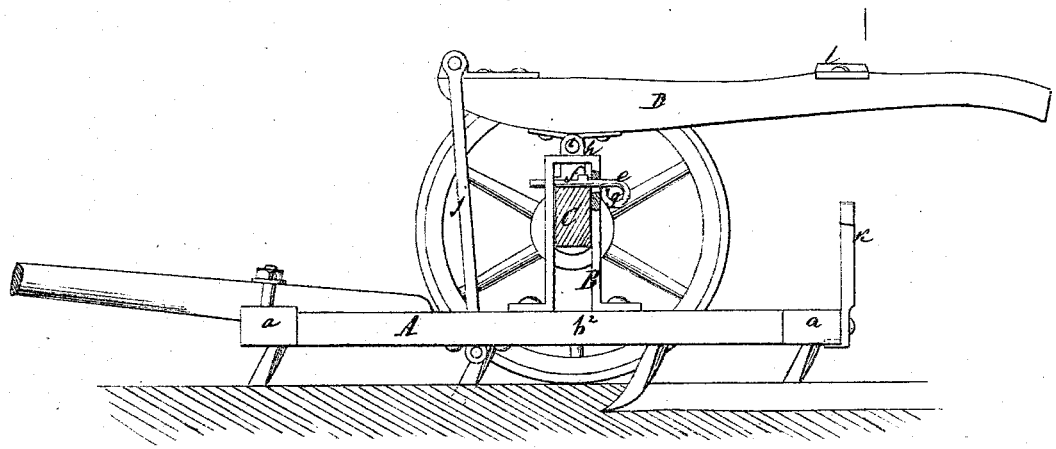
Figure 2:
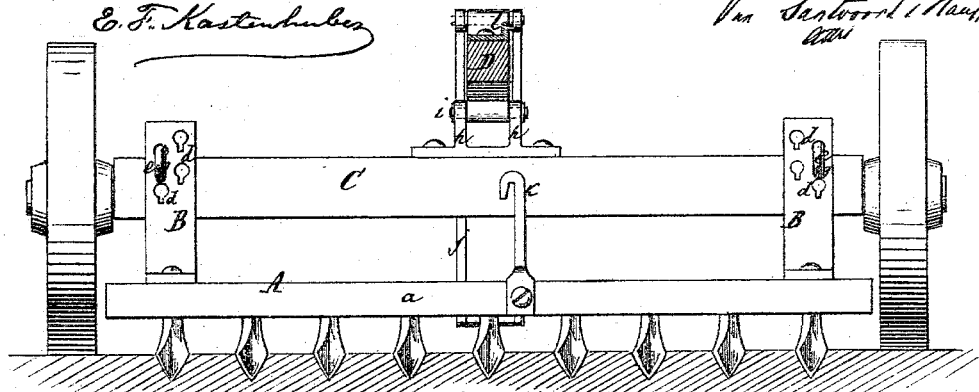
Figure 3:
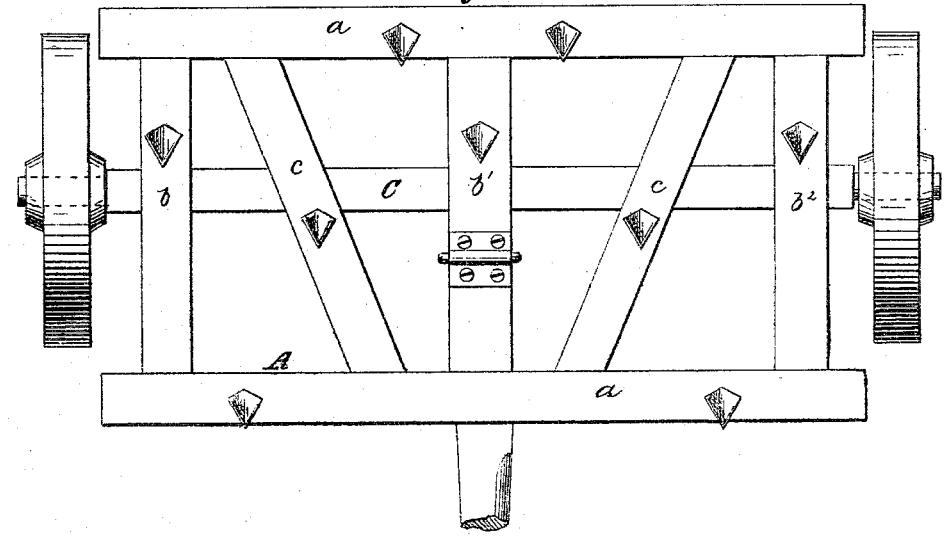

Figure 1 represents a sectional side view of this invention. Fig. 2 is a rear elevation of the same. Fig. 3 is an inverted plan of the frame.

Similar letters indicate corresponding parts.

This invention relates to cultivators, and consists in a new arrangement of parts, as will be hereinafter more fully described.

In the drawing, the letter A designates the frame of my cultivator. This frame is constructed of two lateral beams, $a\ a$, which are connected to each other by three parallel cross-bars, $b\ b^1\ b^2$, and two oblique cross-bars, $c\ c$, as shown in Fig. 3. In each of the longitudinal beams I secure two teeth, and in each of the cross-bars one tooth, and by the relative position of the beams and cross-bars I am enabled to distribute the teeth in such a manner that the whole space beneath the frame is reached, and, at the same time, the frame can be constructed light, and the strength of the beams and bars is but little impaired, since it requires only one or two holes in each to receive the teeth. From each of the end cross-bars $b\ b^2$ of the frame A rises a U-shaped standard, B, and these standards straddle the axle C and form the guides for the axle. In the sides of the standards is a series of pear-shaped holes, $d$, (see Fig. 2,) to receive stop-pins $e$, and these pins are provided with noses $f$ and gravitating heads $g$, so that after the same have been passed through certain holes in the standards, their heads, when allowed to follow their inherent gravity, turn the pins, throwing the noses $f$ up, and thereby the pins automatically locked and prevented from dropping out. On the axle C are secured two standards, $h$, which form the bearings for the fulcrum-pin $i$ of a lever, D. The front end of this lever connects, by a strap, $j$, with the middle cross-bar $b^1$ of the frame A, said stop being hinged to the lever and to the cross-bar, so that by depressing the rear end of the lever the frame A can be readily and easily raised or lowered, and at the same time a firm and durable connection between the several parts is effected. From the rear edge of the frame A rises a hook, $k$, and if the lever D is depressed this hook catches over the lip $l$, fastened to said lever so as to retain the frame A in its raised position while the implement is drawn from one field to another.

By these means a cultivator is obtained which is light, cheap, and durable, and which can be operated with ease and convenience.

I do not claim the devices herein described in themselves considered, as I am aware that they are not new; but What I do claim is—

The arrangement of the frame A, axle C, standards B having the self-locking pins $e$, the standards $h$, lever D, hinged strap $j$, and hook $k$, as herein shown and described, for the purpose specified.

PHILIP MAIER.

Witnesses:
WM. A. WINZENBURG,
MARTIN CARNEY.